United States Patent
Kanda

(10) Patent No.: US 8,290,280 B2
(45) Date of Patent: Oct. 16, 2012

(54) IMAGE PROCESSING DEVICE, IMAGE PROCESSING METHOD, AND COMPUTER READABLE STORAGE MEDIUM STORING IMAGE PROCESSING PROGRAM

(75) Inventor: Yamato Kanda, Hino (JP)

(73) Assignee: Olympus Corporation, Tokyo (JP)

( * ) Notice: Subject to any disclaimer, the term of this patent is extended or adjusted under 35 U.S.C. 154(b) by 379 days.

(21) Appl. No.: 12/638,025

(22) Filed: Dec. 15, 2009

(65) Prior Publication Data

US 2010/0183204 A1 Jul. 22, 2010

(30) Foreign Application Priority Data

Dec. 16, 2008 (JP) ................................ 2008-319994

(51) Int. Cl.
*G06K 9/34* (2006.01)
*G06K 9/32* (2006.01)
(52) U.S. Cl. .................... 382/219; 382/173; 382/294
(58) Field of Classification Search .................. 382/100, 382/131, 132, 173, 294, 130, 128; 348/76; 600/407; 378/98; 345/179; 715/964
See application file for complete search history.

(56) References Cited

U.S. PATENT DOCUMENTS

| | | | | |
|---|---|---|---|---|
| 5,343,390 A * | 8/1994 | Doi et al. | | 382/132 |
| 5,604,531 A * | 2/1997 | Iddan et al. | | 348/76 |
| 6,801,645 B1 * | 10/2004 | Collins et al. | | 382/130 |
| 6,933,933 B2 * | 8/2005 | Fleming | | 345/179 |
| 7,340,034 B2 * | 3/2008 | Hayashida et al. | | 378/98 |
| 7,483,919 B2 * | 1/2009 | Galperin | | 1/1 |
| 7,899,514 B1 * | 3/2011 | Kirkland et al. | | 600/407 |
| 7,912,269 B2 * | 3/2011 | Ikeda et al. | | 382/131 |
| 8,009,932 B2 * | 8/2011 | Zhou et al. | | 382/294 |
| 2005/0240882 A1 * | 10/2005 | Morita et al. | | 715/964 |

FOREIGN PATENT DOCUMENTS

| | | |
|---|---|---|
| JP | 2004-521662 | 7/2004 |
| JP | 2006-296569 | 11/2006 |
| WO | WO 01/87377 A2 | 11/2001 |

* cited by examiner

*Primary Examiner* — Sheela Chawan
(74) *Attorney, Agent, or Firm* — Scully, Scott, Murphy & Presser, P.C.

(57) ABSTRACT

An image processing device includes a region-of-interest detecting unit that detects a region of interest from each of sequence images acquired in chronological order; a region dividing unit that divides a plurality of images temporally neighboring to each other into regions based on region-of-interest detection results obtained from the plurality of images; an inter-image variation calculating unit that calculates an inter-image variation between the plurality of images based on a variation in each region obtained by the division by the region dividing unit; and a display-condition setting unit that sets a display condition for each image based on the inter-image variation.

16 Claims, 7 Drawing Sheets

IMAGE PROCESSING DEVICE, IMAGE PROCESSING METHOD, AND COMPUTER READABLE STORAGE MEDIUM STORING IMAGE PROCESSING PROGRAM

CROSS-REFERENCE TO RELATED APPLICATIONS

This application is based upon and claims the benefit of priority from Japanese Patent Application No. 2008-319994, filed on Dec. 16, 2008, the entire contents of which are incorporated herein by reference.

BACKGROUND OF THE INVENTION

1. Field of the Invention

The present invention relates to an image processing device, an image processing method, and a computer readable recording medium storing image processing program for processing sequence images acquired in chronological order.

2. Description of the Related Art

As a technique for enabling efficient observation of a large number of sequence images, Japanese National Publication of International Patent Application No. 2004-521662, for example, discloses a method for changing an image display rate depending on a similarity between images. More specifically, the similarity between images is obtained based on a difference between pixel values or the like of images temporally neighboring to each other. Then, when the similarity is high, i.e., when change between the images is small, the images are displayed at an increased display rate, and, when the similarity is low, i.e., when change between the images is large, the images are displayed at a decreased display rate.

Furthermore, Japanese Laid-open Patent Publication No. 2006-296569 discloses a method for changing a display rate or making a setting whether each image is to be displayed or not, depending on an occupancy rate of a region of interest (feature region) in each image constituting sequence images. More specifically, the region of interest in an image is detected based on its color information or the like. Then, when the occupancy rate of the region of interest in the image is high, the image is displayed at low speed with a decreased display rate, and, when the occupancy rate of the region of interest in the image is low, the image is displayed at high speed with an increased display rate or the image is even not displayed.

SUMMARY OF THE INVENTION

An image processing device according to an aspect of the present invention includes a region-of-interest detecting unit that detects a region of interest from each of sequence images acquired in chronological order; a region dividing unit that divides a plurality of images temporally neighboring to each other into regions based on region-of-interest detection results obtained from the plurality of images; an inter-image variation calculating unit that calculates an inter-image variation between the plurality of images based on a variation in each region obtained by the division by the region dividing unit; and a display-condition setting unit that sets a display condition for each image based on the inter-image variation.

An image processing method according to another aspect of the present invention includes detecting a region of interest from each of sequence images acquired in chronological order; dividing a plurality of images temporally neighboring to each other into regions based on region-of-interest detection results obtained from the plurality of images; calculating an inter-image variation between the plurality of images based on a variation in each region obtained at the dividing; and setting a display condition for each image based on the inter-image variation.

A computer readable recording medium according to still another aspect of the present invention has stored therein an image processing program including instructions. The instructions cause a computer to execute detecting a region of interest from each of sequence images acquired in chronological order; dividing a plurality of images temporally neighboring to each other into regions based on region-of-interest detection results obtained from the plurality of images; calculating an inter-image variation between the plurality of images based on a variation in each region obtained at the dividing; and setting a display condition for each image based on the inter-image variation.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
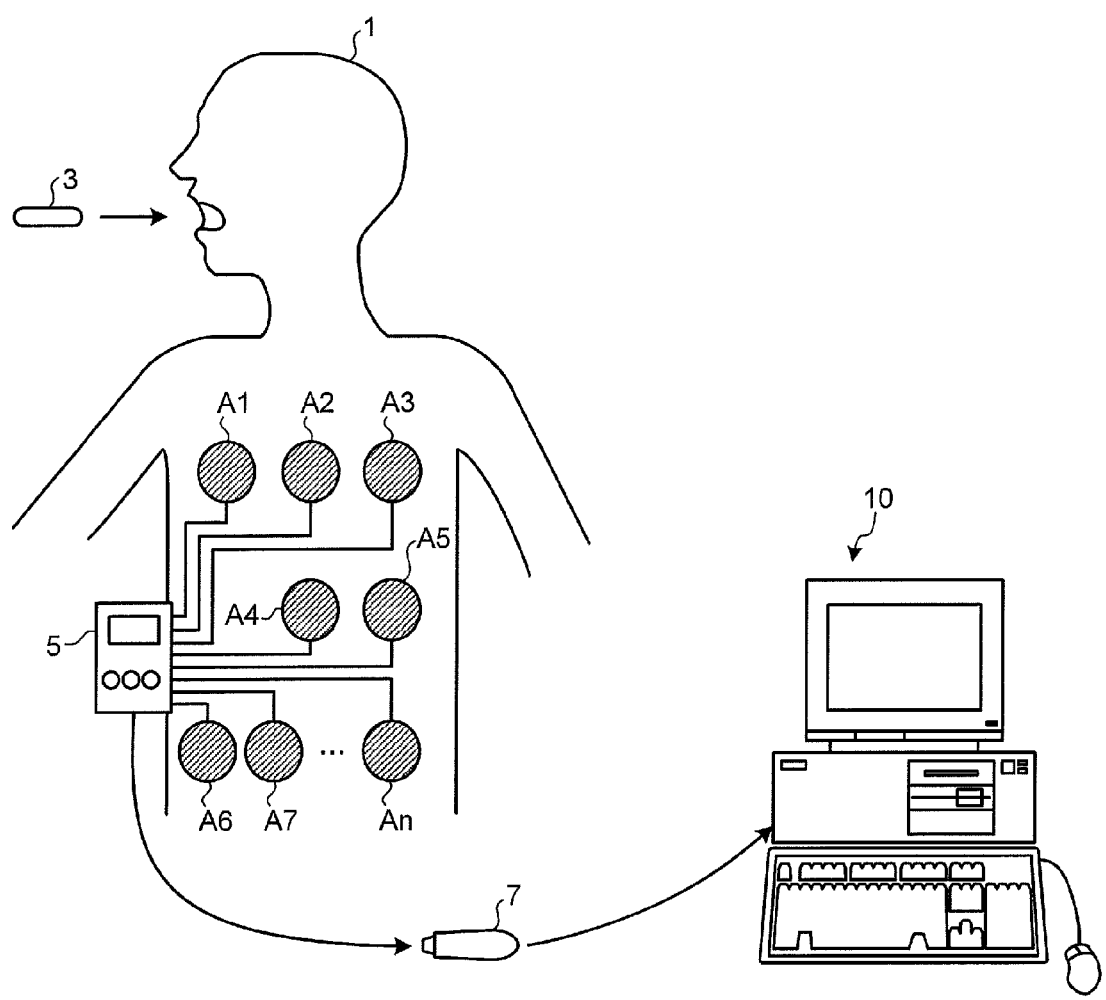
FIG. 1 is a schematic diagram of an overall configuration of an image processing system including an image processing device.

Exemplary embodiments of the present invention will be explained in detail below with reference to the accompanying drawings. The present invention is not limited by the following embodiments. Furthermore, identical portions in the drawings are denoted with the same reference symbols.

FIG. 1 is a schematic diagram of an overall configuration of an image processing system including an image processing device of a present embodiment. As illustrated in FIG. 1, the image processing system includes a capsule endoscope 3, a receiving device 5, an image processing device 10, and the like. The capsule endoscope 3 captures an image of the inside of a subject 1. The receiving device 5 receives an image wirelessly-transmitted from the capsule endoscope 3. The image processing device 10 processes the image captured by the capsule endoscope 3 and received by the receiving device 5, and displays the processed image. For transfer and receipt of image data between the receiving device 5 and the image processing device 10, a field-portable recording medium (portable recording medium) 7 or the like is used.

The capsule endoscope 3 is a compact imaging device that sequentially captures images of the inside of a lumen (intraluminal images) in time series while moving through the inside of the lumen, and is used to examine an in-vivo lumen such as a digestive tract. The capsule endoscope 3 is swallowed by the subject 1 through his/her mouth, and introduced into the subject 1. Then, the capsule endoscope 3 sequentially captures the intraluminal images while moving through the inside of the in-vivo lumen, and then wirelessly transmits the captured intraluminal images to the outside of the body.

Figure 2:
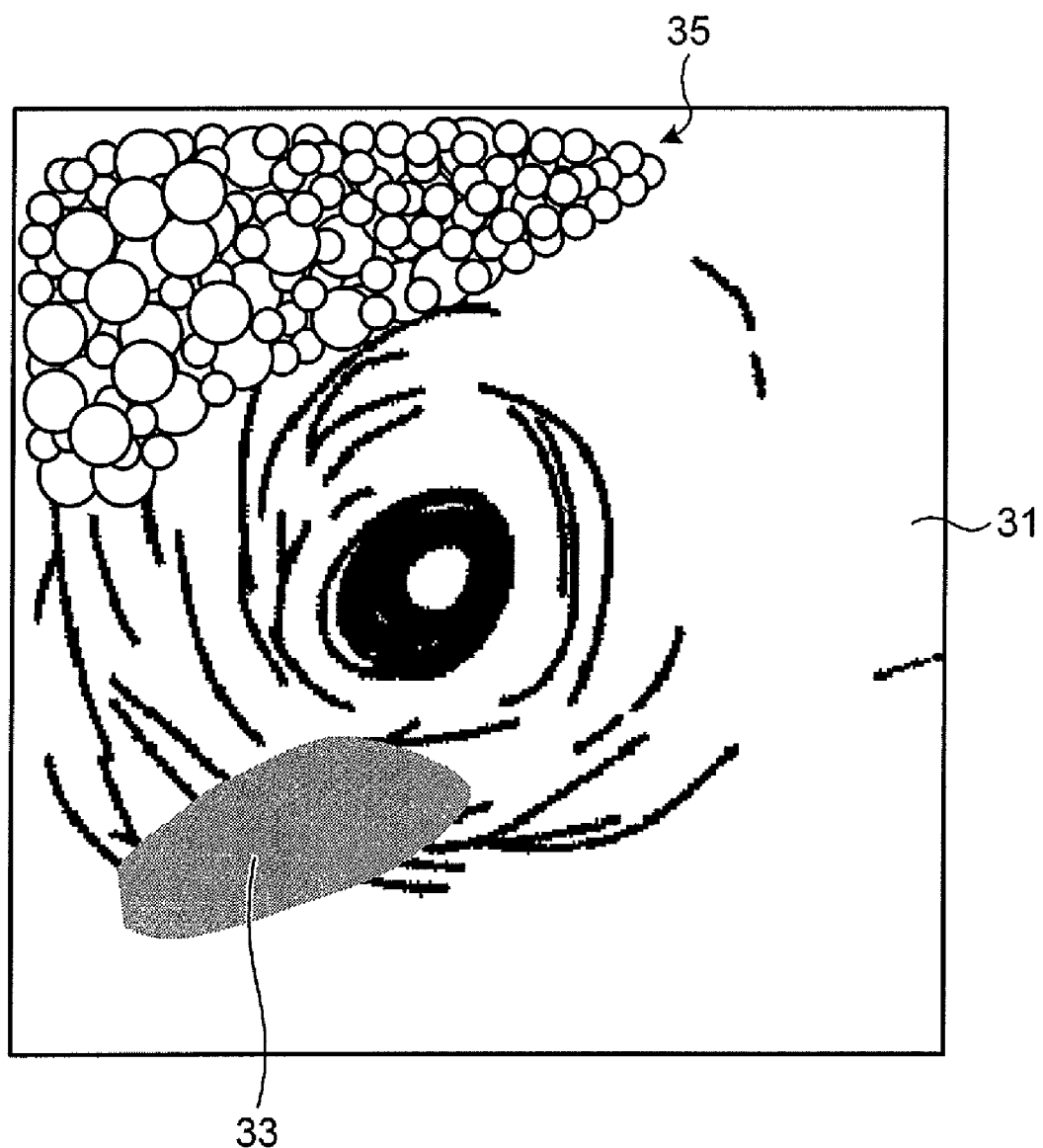
FIG. 2 is a schematic diagram of an example of an intraluminal image.

The number of intraluminal images to be captured in time series by the capsule endoscope 3 is approximately represented by an imaging rate (about 2 to 4 frames/sec)×an in-vivo residence time of the capsule endoscope (about 8 hours=8×60×60 sec), which results in 50 to 60 thousands. FIG. 2 is a schematic diagram of the intraluminal image captured by the capsule endoscope 3. As illustrated in FIG. 2, an intraluminal image mainly contains a mucous membrane 31, and sometimes contains contents 33, bubbles 35, and the like. A doctor observes as many as 50 to 60 thousands intraluminal images in time series while paying particular attention to a mucosal region to detect an abnormality (lesion) or the like in the mucous membrane. Therefore, there is a need to set an image display condition in which change in a region of interest, such as the mucosal region, in the time-series intraluminal images can be efficiently observed. An intraluminal image captured by the capsule endoscope 3 is generally a color image having pixel levels (pixel values) corresponding to R (red), G (green), and B (blue) color components, respectively, at each pixel position.

The receiving device 5 includes receiving antennas A1 to An that are arranged to be dispersed at positions on the body surface corresponding to a passage route of the capsule endoscope 3 introduced into the subject 1. The receiving device 5 receives image data wirelessly transmitted from the capsule endoscope 3 via each of the receiving antennas A1 to An. The receiving device 5 is configured to detachably attach the portable recording medium 7 thereto, and sequentially stores received image data in the portable recording medium 7. In this manner, the images of the inside of the subject 1 (intraluminal images) captured by the capsule endoscope 3 are stored in the portable recording medium 7 in chronological order as sequence images by the receiving device 5.

The image processing device 10 is used by a doctor or the like to observe and diagnose images (intraluminal images) captured by the capsule endoscope 3, and is realized by a general-purpose computer such as a workstation or a personal computer. The image processing device 10 is configured to detachably attach the portable recording medium 7 thereto. The image processing device 10 processes each image constituting the sequence images stored in the portable recording medium 7, and then displays the processed images in chronological order on a display such as an LCD or an EL display.

The present embodiment is configured to detect a region of interest from each image constituting the sequence images which are captured by the capsule endoscope 3 as described above, and set a display condition for each image based on a result of detection of the region of interest (region-of-interest detection result).

The "region of interest" is a region to be paid attention to by an observer, i.e., a region to be an observation target, and is a region in which a detecting object is likely to exist. The following explanation is given by taking time-series intraluminal images captured by the capsule endoscope 3 as an example of the sequence images. In this example, a region containing an object that a doctor intends to detect from among the intraluminal images is regarded as the region of interest. For example, when a doctor intends to detect an "affected area" being abnormality occurring in body tissue (mucous membrane) of an inner wall of an in-vivo lumen from among the intraluminal images, the doctor observes the intraluminal images with careful attention to a mucous membrane in which the affected area is likely to exist. Consequently, a mucosal region is regarded as the region of interest, i.e., the region as the observation target in which the affected area may be detected with high probability.

On the other hand, a "region of non-interest" is a region other than the "region of interest" in an image, and is a region in which an object to be detected is not likely to exist. In the example of the intraluminal images as described above, regions containing the bubbles and the contents, which are other than the mucosal region as the "region of interest", are regarded as the "regions of non-interest".

What region in an image is regarded as the region of interest or the region of non-interest depends on an object to be detected. For example, when a doctor observes intraluminal images to detect "foreign matter in contents", a region containing the contents in the images is regarded as the region being the observation target in which the foreign matter may be detected with high probability. Consequently, a contents region is regarded as the region of interest. In this case, regions containing a mucosal region and bubbles, which are other than the contents region as the region of interest, are regarded as the regions of non-interest.

Furthermore, what region in an image actually corresponds to the region of interest or the region of non-interest is determined depending on feature data such as color or texture indicating features of each pixel.

Figure 3:
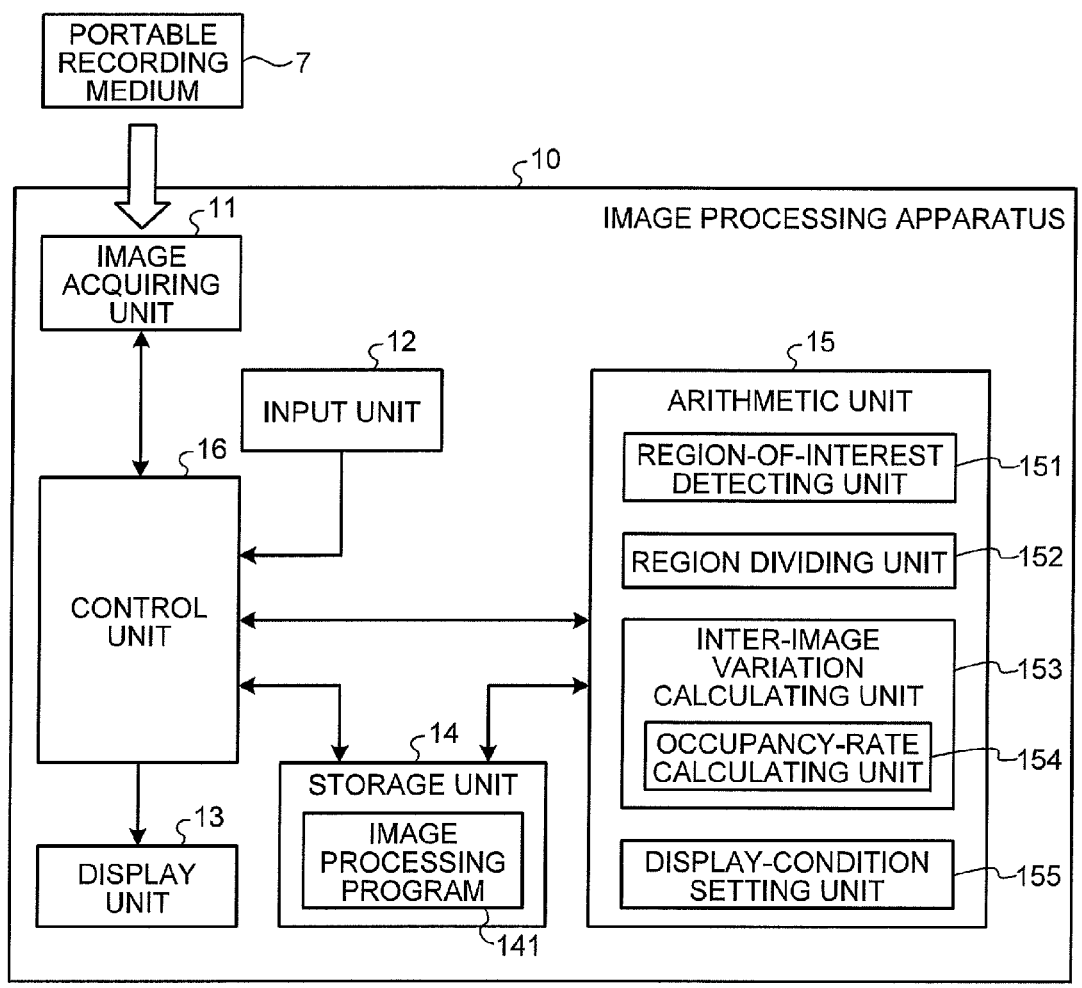
FIG. 3 is a block diagram illustrating a functional configuration of the image processing device.

FIG. 3 is a block diagram illustrating a functional configuration of the image processing device 10 according to a first embodiment of the present invention. In the present embodiment, the image processing device 10 includes an image acquiring unit 11, an input unit 12, a display unit 13, a storage unit 14, an arithmetic unit 15, and a control unit 16 that controls each unit of the apparatus.

The image acquiring unit 11 acquires sequence images that are captured by the capsule endoscope 3 and stored in the portable recording medium 7 by the receiving device 5. For example, the image acquiring unit 11 detachably attaches the portable recording medium 7 thereto, and reads to acquire image data of each image constituting the sequence images accumulated in the attached portable recording medium 7. The image acquiring unit 11 is realized by, for example, a read-write device compatible with a type of the portable recording medium 7. Here, acquisition of the sequence images captured by the capsule endoscope 3 is not limited by use of the portable recording medium 7. For example, it is possible to provide a hard disk instead of the image acquiring unit 11 in the configuration and store the sequence images captured by the capsule endoscope 3 in advance in the hard disk. It is also possible to separately provide a server instead of the portable recording medium 7 in the configuration and store the sequence images in advance in the server. In this case, an image acquiring unit is formed by a communication device or the like to enable connection to the server, and the sequence images are acquired from the server by connection to the server via the image acquiring unit.

The input unit 12 is realized by, for example, a keyboard, a mouse, a touch panel, and various types of switches, and outputs to the control unit 16 an operational signal corresponding to an operational input. The display unit 13 is realized by a display device such as an LCD and an EL display, and displays various types of screens including a display screen for the time-series intraluminal images with control by the control unit 16.

The storage unit 14 is realized by an information recording medium, for example, various types of IC memories such as a ROM and a RAM which are each made up of a flash memory capable of updating stored data, a built-in hard disk, a hard disk connected via a data communication terminal, and a CD-ROM; and a reading device for the information recording medium. The storage unit 14 stores therein a computer program that runs the image processing device 10 and executes various functions of the image processing device 10, data to be used during execution of the computer program, and the like. Furthermore, the storage unit 14 stores therein an image processing program 141 for setting a display condition for each image constituting the sequence images.

The arithmetic unit 15 is realized by hardware such as a CPU, processes the sequence images acquired by the image acquiring unit 11, and performs various types of arithmetic processing for setting the display condition for each image constituting the sequence images. The arithmetic unit 15 includes a region-of-interest detecting unit 151, a region dividing unit 152, an inter-image variation calculating unit 153, and a display-condition setting unit 155. The region-of-interest detecting unit 151 detects a region of interest from each image of the sequence images captured by the capsule endoscope. The region dividing unit 152 divides a plurality of images temporally neighboring to each other into regions based on a region-of-interest detection result from the plurality of images. The inter-image variation calculating unit 153 calculates an inter-image variation based on a variation in each divided region. The inter-image variation calculating unit 153 includes an occupancy-rate calculating unit 154 that calculates an occupancy rate of each region divided by the region dividing unit 152 in a whole image region. The display-condition setting unit 155 sets a display condition for each image based on the inter-image variation.

The control unit 16 is realized by hardware such as a CPU. The control unit 16 sends an instruction to or transfers data to each unit constituting the image processing device 10 based on image data input from the image acquiring unit 11, an operational signal input from the input unit 12, a computer program and data stored in the storage unit 14, and the like, and controls the overall operations of the image processing device 10.

Figure 4:
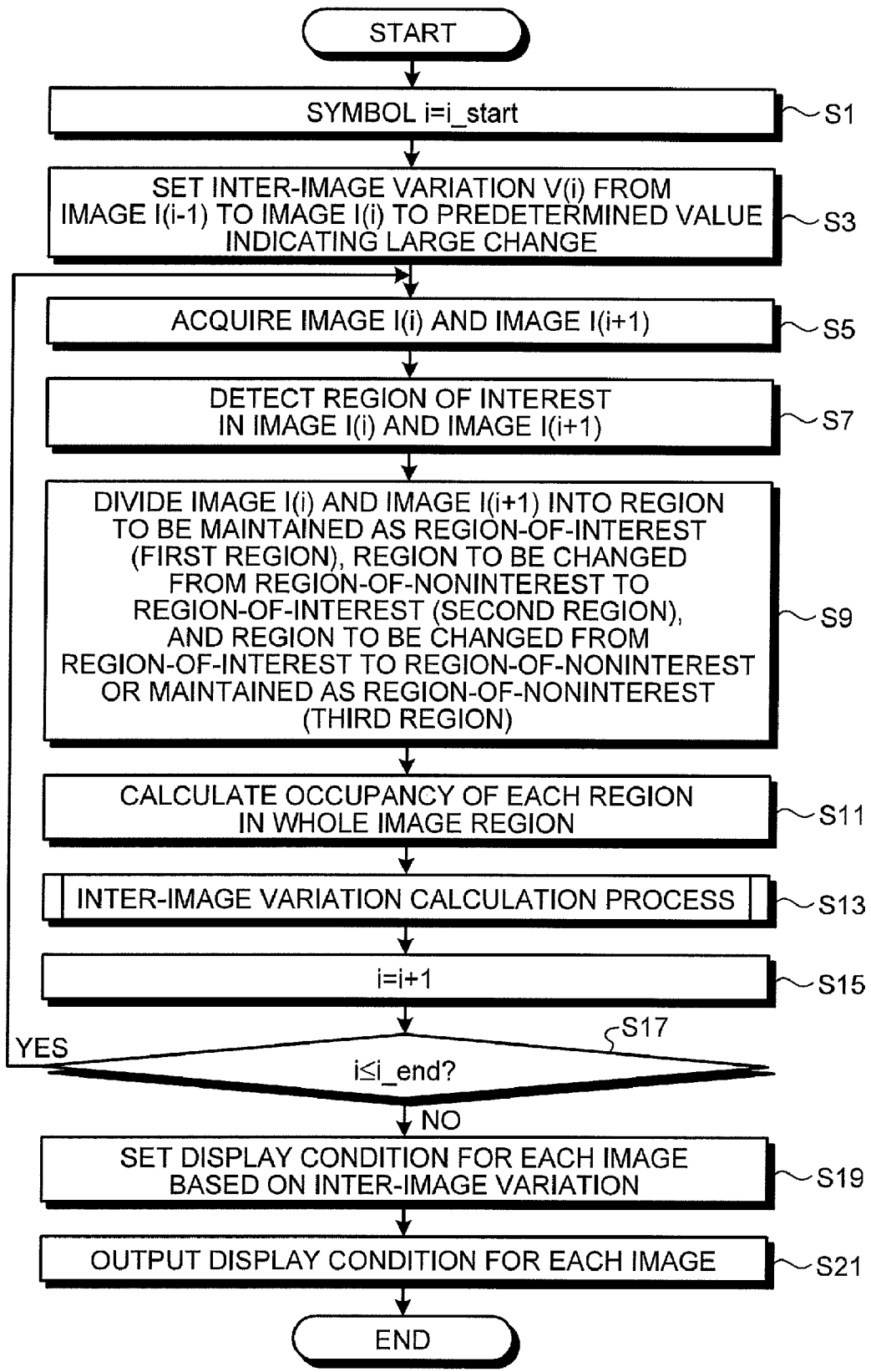
FIG. 4 is an overall flowchart of a procedure of a process performed by the image processing device.

FIG. 4 is an overall flowchart of a procedure of a process performed by the image processing device 10 of the first embodiment. The process described below is realized by causing the arithmetic unit 15 to execute the image processing program 141 stored in the storage unit 14. In this example, a procedure for processing images I(i_start) to I(i_end) that constitute sequence images in a range from i_start to i_end in chronological order is illustrated.

As illustrated in FIG. 4, the arithmetic unit 15 sets a symbol i indicating an order of an image to be processed among the sequence images to i_start (Step S1). Then, the inter-image variation calculating unit 153 sets an inter-image variation V(i) from an image I(i−1) to an image I(i) to a predetermined value indicating large change in the image (Step S3). Because i has been set to i_start at Step S1, the image I(i) becomes the image I(i_start), meaning that the image I(i) is a top image in chronological order. Therefore, the image I(i−1) does not actually exist. Consequently, as the inter-image variation V(i) from a state where no image exists to a state where an image exists, the predetermined value is set in advance as a value indicating large change in the image.

Next, the arithmetic unit 15 acquires the image I(i) and an image I(i+1) (Step S5). In the present example, two temporally consecutive images are employed as the plurality of images temporally neighboring to each other. However, the images need not be consecutive, and images that are not consecutive but temporally neighboring to each other can also be employed.

Next, the region-of-interest detecting unit 151 detects a region of interest in the image I(i) and the image I(i+1) (Step S7). As described above, in the present embodiment, it is assumed that a doctor observes the images with careful attention to the mucosal region in the intraluminal images. Therefore, in the present example, it is assumed that the mucosal region is detected as the region of interest. Although a variety of methods can be employed as a method for detecting the mucosal region, a detection method based on feature data such as color or texture will be described below.

A method based on color feature data will be described first. In the method based on the color feature data, a large number of pixels belonging to a mucosal region are sampled from a plurality of images and color feature data of the pixels is obtained in advance. Herein, the color feature data is, for example, a pixel value for each color component of a target pixel, or a value secondary calculated from the pixel value by well-known transformations, e.g., a color difference (YCbCr transformation), hue, saturation (HSI transformation), a color ratio (G/R, B/G), and the like. Subsequently, a feature vector $Fn=(fn\_1, fn\_2, \ldots, fn\_k)^t$ consisted of the color feature data of the sampled pixels is calculated. Herein, fn_j represents a j-th feature data value of n-th supervised data, and k represents the number of pieces of feature data. Then, a mean vector μ and a variance-covariance matrix Z are obtained according to the following equation (1) based on the feature vector Fn, and then stored in the storage unit 14. Herein, ND represents the number of pieces of sampling data.

$$\mu = \frac{1}{ND}\sum_{n=1}^{ND} Fn, \quad Z = \frac{1}{ND}\sum_{n=1}^{ND}(Fn-\mu)(Fn-\mu)^t \quad (1)$$

Then, possibility density P(x) as a determination index for determining whether each pixel corresponds to the mucosal region or the region other than the mucosal region is calculated according to the following equation (2) based on a feature vector $x=(x\_1, x\_2, \ldots, x\_k)^t$ consisted of the color feature data of each pixel in the image I(i) and the image I(i+1) as processing targets; and the mean vector μ and the variance-covariance matrix Z obtained and stored in the storage unit 14 in advance. Then, a pixel for which P(x) becomes equal to or larger than a predetermined threshold is detected as the region of interest. Herein, |Z| represents a determinant of Z, and $Z^{-1}$ represents an inverse matrix of Z.

$$P(x) = \frac{1}{(2\pi)^{k/2} \times |Z|^{1/2}} \exp\left\{(x-\mu)^t \times -\frac{1}{2}Z^{-1} \times (x-\mu)\right\} \quad (2)$$

Next, a method based on texture feature data is described. In the method based on the texture feature data, a plurality of images are divided into rectangular areas of predetermined size and a large number of rectangular areas belonging to the mucosal region are sampled in advance. Then, the texture feature data of the rectangular areas is obtained. The texture feature data is a quantified repetition pattern of pixel values, and is a well-known frequency feature, a co-occurrence matrix (see CG-ARTS society, Digital Image Processing, pp. 192, Area Feature Data), or the like. These can also be calculated by using pixel values of each color component, a specific color component, or a secondary-calculated value.

Subsequently, a feature vector $Fn=(fn\_1, fn\_2, \ldots, fn\_k)^t$ consisted of the texture feature data of the sampled rectangular areas is calculated. Herein, fn_j represents a j-th feature data value of n-th supervised data, and k represents the number of pieces of feature data. Then, the mean vector μ and the variance-covariance matrix Z are obtained according to the above-mentioned equation (1) based on the feature vector Fn, and are stored in the storage unit 14.

Subsequently, the image I(i) and the image I(i+1) as the processing targets are divided into rectangular areas of predetermined size, and the possibility density P(x) as the determination index for determining whether each pixel corresponds to the mucosal region or the region other than the mucosal region is calculated according to the above-mentioned equation (2) based on the feature vector $x=(x\_1, x\_2, \ldots, x\_k)^t$ consisted of the texture feature data of each rectangular area; and the mean vector μ and the variance-covariance matrix Z obtained and stored in the storage unit 14 in advance. Then, a rectangular area (a pixel belonging to the rectangular area) for which P(x) becomes equal to or larger than a predetermined threshold is detected as the region of interest.

Figure 5:
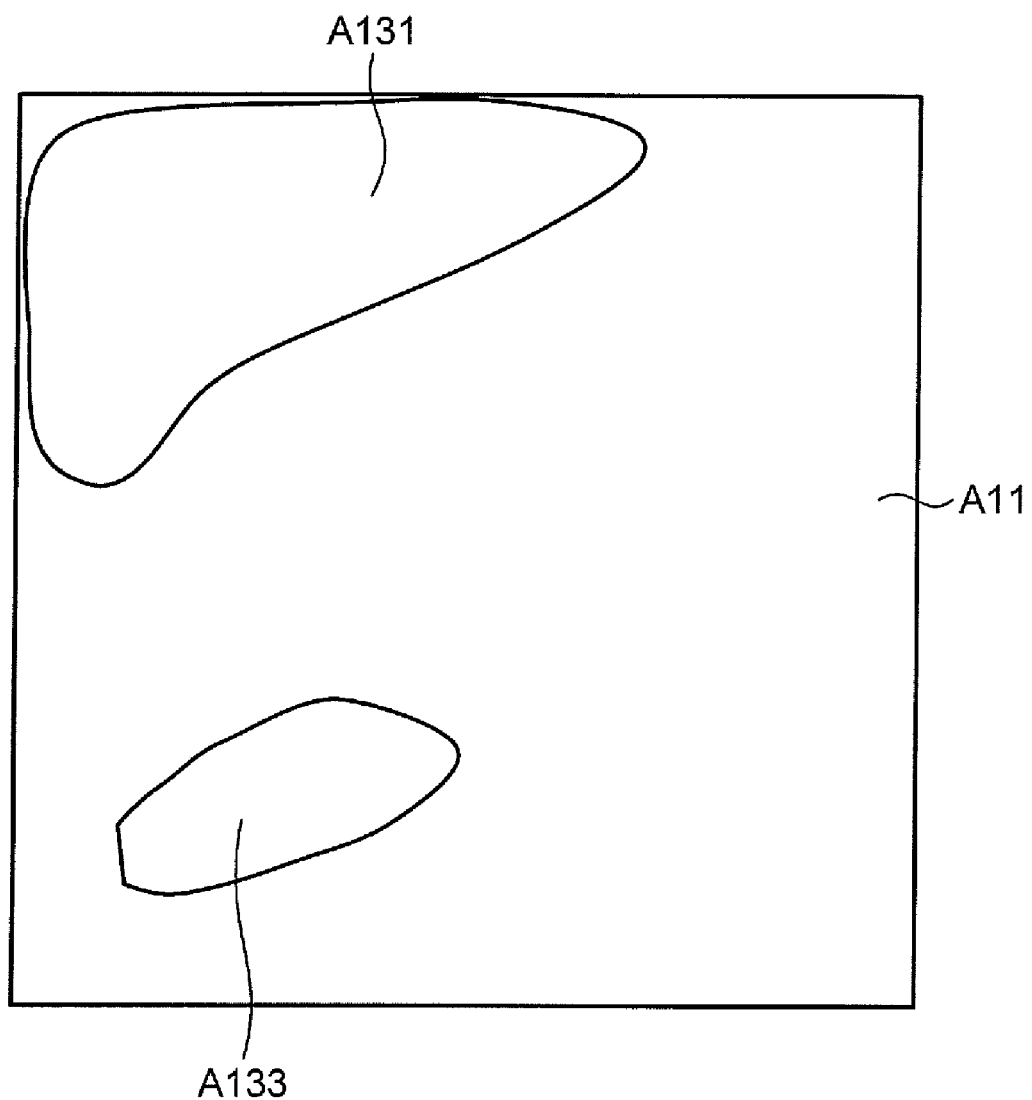
FIG. 5 is a schematic diagram illustrating a region-of-interest detection result in the image (intraluminal image) illustrated in FIG. 2.

FIG. 5 is a schematic diagram illustrating a region-of-interest detection result from an image (image of the intraluminal) illustrated in FIG. 2. As illustrated in FIG. 5, by the processing herein, a region in which the mucous membrane 31 illustrated in FIG. 2 appears is detected as a region of interest A11, and regions in which the contents 33 and the bubbles 35 illustrated in FIG. 2 appear are detected as regions of non-interest A131 and A133 that are regions other than the region of interest.

As described above, in the present example, the methods for detecting the mucosal region by using a probability density function based on the color feature data of pixel values or the texture feature data of rectangular areas are explained; however, the detection method may vary depending on a target region of interest. That is, as long as it is possible to detect the region of interest in an image, any detection methods other than the methods of the present example can be employed.

Next, as illustrated in FIG. 4, the region dividing unit 152 divides the image I(i) and the image I(i+1) into, for example, the first region, the second region, and the third region (Step S9). Herein, the first region represents a region in which the region-of-interest detection results in the image I(i) and the image I(i+1) are maintained as the region of interest in time series; the second region represents a region to be changed from the region of non-interest to the region of interest; and the third region collectively represents a region to be changed from the region of interest to the region of non-interest and a region to be maintained as the region of non-interest.

Figure 6:
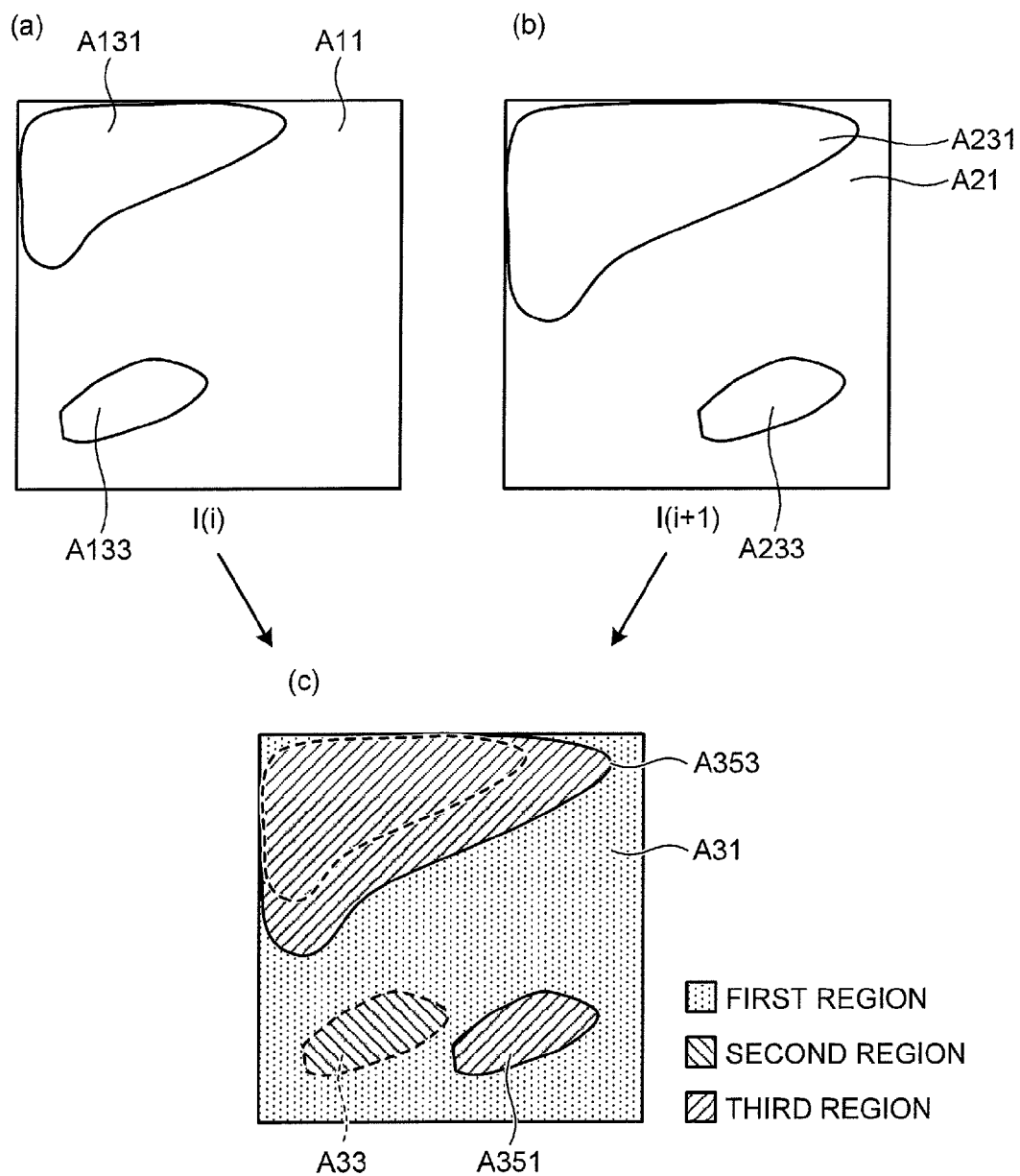
FIG. 6 is a diagram for explaining division into regions based on region-of-interest detection results in an image I(i) and an image I (i+1)

FIG. 6 is a diagram for explaining division into the regions based on the region-of-interest detection results in the image I(i) and the image I(i+1). An example of the region-of-interest detection result in the image I(i) is illustrated at (a) in FIG. 6, where regions A11, A131, and A133 are shown; an example of the region-of-interest detection result in the image (i+1) is illustrated at (b) in FIG. 6, where regions A21, A231, and A233 are shown; and an example of a result of the division into the regions based on the region-of-interest detection results illustrated at (a) and (b) in FIG. 6 is illustrated at (c) in FIG. 6. At (c) in FIG. 6, a contour of the region of interest detected in the image I(i) is illustrated by a dashed line, and a contour of the region of interest detected in the image I(i+1) is illustrated by a solid line. By the processing herein, the image I(i) and the image I(i+1) are divided into the first region A31, the second region A33, and two third regions A351 and A352 as illustrated at (c) in FIG. 6.

As actual processing, a label image of the same size as the image I(i) is prepared for recording information about the division into regions. Then, a label value is assigned to a target pixel in the label image by reference to whether each pixel in the image I(i) and the image I(i+1) at the same coordinate as a coordinate of each pixel in the label image is the region of interest or the region of non-interest. More specifically, with respect to the target pixel in the label image, a label value indicating the first region is assigned to a pixel to be maintained as the region of interest, a label value indicating the second region is assigned to a pixel to be changed from the region of non-interest to the region of interest, and a label value indicating the third region is assigned to a pixel to be changed from the region of interest to the region of non-interest and a pixel to be maintained as the region of non-interest.

Next, as illustrated in FIG. 4, the occupancy-rate calculating unit 154 calculates an occupancy rate of each of the first to the third divided regions in the whole image region (Step S11). More specifically, the number of pixels belonging to the first region in the label image is obtained as an Area_1; the number of pixels belonging to the second region in the label image is obtained as an Area_2; and the number of pixels belonging to the third region in the label image is obtained as an Area_3. Then, an occupancy rate Occ_1 of the first region, an occupancy rate Occ_2 of the second region, and an occupancy rate Occ_3 of the third region are respectively obtained according to the following equations (3) to (5) based on the areas Area_1, Area_2, and Area_3.

$$Occ\_1 = \frac{Area\_1}{Area\_1 + Area\_2 + Area\_3} \quad (3)$$

$$Occ\_2 = \frac{Area\_2}{Area\_1 + Area\_2 + Area\_3} \quad (4)$$

$$Occ\_3 = \frac{Area\_3}{Area\_1 + Area\_2 + Area\_3} \quad (5)$$

Figure 7:
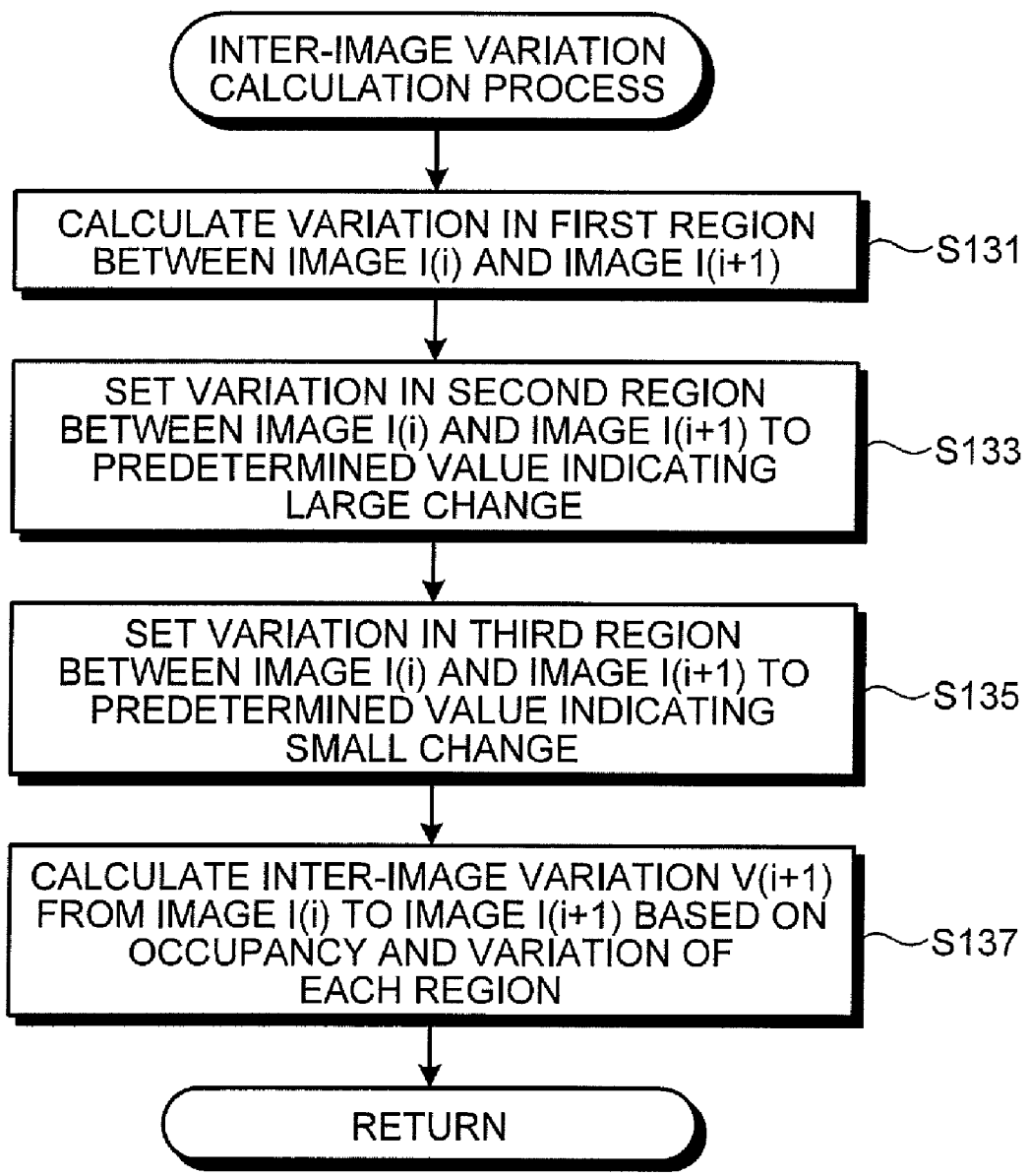
FIG. 7 is a flowchart of a detailed processing procedure of an inter-image variation calculation process.

Next, the inter-image variation calculating unit 153 performs an inter-image variation calculation process to calculate an inter-image variation V(i+1) between the image I(i) and the image I(i+1) (Step S13). FIG. 7 is a flowchart of a detailed processing procedure of the inter-image variation calculation process.

Herein, for the region to be maintained as the region of interest, i.e., the first region, it is preferable to reflect change in the image in the region in an inter-image variation. Therefore, as illustrated in FIG. 7, in the inter-image variation calculation process, the inter-image variation calculating unit 153 firstly calculates a variation Va_1 in the first region between the image I(i) and the image I(i+1) (Step S131). Although a variety of methods can be employed as a method for calculating a variation, a method based on a similarity or a dissimilarity, a displacement amount, and change in statistic of the first region between the images will be described below.

A method based on the similarity or the dissimilarity is described first. Herein, the similarity is an index indicating a similarity between comparison regions, and the dissimilarity is an index indicating a dissimilarity between comparison regions. Then, a sum of squared differences SSD between pixel values of pixels belonging to the first region in the image I(i) and those in the image I(i+1) is calculated according to the following equation (6). In the following equation (6), $P_{I(i)}$ (x, y) represents a pixel value at the coordinate (x, y) of the image I(i). Because each image has pixel values corresponding to R (red), G (green), and B (blue) color components, respectively, a value of SSD can be calculated using each color component. Therefore, a total value or a mean value of SSD of each color component is to be calculated as the variation Va_1 in the first region.

$$SSD = \Sigma (P_{I(i+1)}(x, y) - P_{I(i)}(x, y))^2 \quad (6)$$

$$\{(x, y) \in \text{first region}\}$$

Alternatively, a sum of absolute differences SAD between pixel values as represented by the following equation (7), a normalized cross-correlation NCC as represented by the following equation (8), or the like can be used instead of SSD. In case of NCC, an obtained value is in a range from −1 to 1, and it increases as the change in the image decreases. Therefore, it is necessary to perform a process for inverting a sign, or the like.

$$SAD = \sum |P_{I(i+1)}(x, y) - P_{I(i)}(x, y)| \quad (7)$$

$$\{(x, y) \in \text{first region}\}$$

$$NCC = \frac{\sum (P_{I(i+1)}(x, y) \times P_{I(i)}(x, y))}{\sqrt{\sum P_{I(i+1)}(x, y)^2 \times \sum P_{I(i)}(x, y)^2}} \quad (8)$$

$$\{(x, y) \in \text{first region}\}$$

Next, a method based on the displacement amount is described. Herein, the displacement amount is an amount of change between coordinates when an identical target is associated between two images captured at different times. Then, a plurality of rectangular areas of predetermined size are set in the first region in the image I(i), and a well-known template matching process is performed on the image I(i+1) by using each rectangular area as a template (see CG-ARTS society, Digital Image Processing, pp. 202, Template Matching).

In the template matching, a similarity or a dissimilarity between images is to be calculated, for which it is preferable to use, as an ultimate similarity or an ultimate dissimilarity, a mean value obtained after calculation of the similarity or the dissimilarity for each color component. Furthermore, a search area r of the matching may preferably be set around a central coordinate of each template in consideration of an imaging rate or speed of displacement of an imaging object. Also, a cross-to-fine search method, a sequential similarity detection algorithm, or the like may be used to increase the speed (see CG-ARTS society, Digital Image Processing, pp. 206, High-Speed Search Method).

Consequently, a coordinate of the most similar area and the similarity or the dissimilarity thereof can be acquired from the image I(i+1) for each template. Then, a vector from the central coordinate of each template in the image I(i) to a central coordinate of the most similar area in the image I(i+1) is obtained to acquire the displacement amount for each rectangular area set in the first region in the image I(i). Subsequently, a maximum value or a mean value of the length of the acquired displacement amount is obtained as the variation Va_1 in the first region. It is highly likely that an identical target is not associated with a template of which similarity at the time of matching is low or of which dissimilarity at the time of matching is high. Therefore, such a template can be excluded from the calculation of a variation.

Next, a method based on the change in a statistic is described. Herein, the statistic is a mean value, a variance value, skewness, a degradation level, a histogram, or the like. For example, a difference D_Euclid between values Stat respectively obtained as the statistics of pixels belonging to the first region in the image I(i) and the image I(i+1) is calculated according to the following equation (9), and then the calculated value is assumed as the variation Va_1 of the first region. Herein, $\text{Stat}_{I(i)}^{d}$ represents the d-th statistic of a pixel belonging to the first region of the image I(i), and D represents the number of the statistics.

$$D\_Euclid = \sqrt{\sum_{d=1}^{D} (\text{Stat}_{I(i+1)}^{d} - \text{Stat}_{I(i)}^{d})^2} \quad (9)$$

When a mean or a variance of pixel values in the region is used as the statistic, because it is calculated for each of R (red), G (green), and B (blue) color components, three statistics are obtained in total. Furthermore, in case of a histogram, when the number of classes for each of R (red), G (green), and B (blue) color components is assumed to be n_edge, the statistics of 3×n_edge are obtained. It is also possible to perform normalization to equalize a range of each statistic, or perform calculation by multiplying each statistic by a weighting factor.

As described above, the method for calculating the variation Va_1 between the image I(i) and the image I(i+1) in the first region is explained. However, as long as it is possible to obtain a value corresponding to the change between the regions, any calculation methods other than the method of the present example can be employed.

Furthermore, while the method for performing processing by using all R (red), G (green), and B (blue) color components is described in the present example, it is possible to perform the processing by using only a color component by which change in the image can be clarified. For example, in the intraluminal image, G component that is close to an absorption band of blood and has high sensitivity and high resolution tends to well represent image information. Therefore, it is possible to perform the above-mentioned processing by using only the G component. Furthermore, it is possible to perform the processing by using a value secondary calculated by well-known transformation based on each pixel value. Examples of the secondary calculated value include luminance and a color difference calculated by YCbCr transformation; and hue, saturation, and brightness calculated by HSI transformation.

After the variation Va_1 for the first region is calculated, as illustrated in FIG. 7, the inter-image variation calculating unit 153 subsequently sets a variation Va_2 in the second region between the image I(i) and the image I(i+1) to a predetermined value indicating large change in an image (Step S133). In a region to be changed from the region of non-interest to the region of interest, i.e., the second region, change in the image to be observed increases because of appearance of a new region of interest. Therefore, with respect to the variation Va_1 calculated for the first region (the similarity or the dissimilarity, the displacement amount, and a difference in the statistic), a predetermined value indicating large change in an image is determined in advance, and the predetermined value is set to the variation Va_2 for the second region. For example, with respect to a set of a large number of sample images collected so that change in the images ranges from small to large, it is confirmed in advance that SSD represented by the above-mentioned equation (6) ranges from minSSD (a state in which change in an image is small) to maxSSD (a state in which change in an image is large). Then, maxSSD indicating large change in an image is set to the variation Va_2 for the second region.

Because the similarity or the dissimilarity, the displacement amount, and the change in the amount of statistics, which are described above, may vary between the region of interest and the region of non-interest, it is possible to obtain the variation Va_2 for the second region in the same manner as the method for the first region instead of the predetermined value set in the present example. However, when the predetermined value is employed, a processing time for calculating the variation can be shortened.

After the variation Va_2 for the second region is calculated, as illustrated in FIG. 7, the inter-image variation calculating unit 153 subsequently sets a variation Va_3 in the third region between the image I(i) and the image I(i+1) to a predetermined value indicating small change in an image (Step S135). In a region to be changed from the region of interest to the region of non-interest or a region to be maintained as the region of non-interest, i.e., the third region, because the region eventually becomes the region of non-interest, any change in the images is not to be observed even when change occurs in the image. Therefore, with respect to the variation Va_1 calculated for the first region (the similarity or the dissimilarity, the displacement amount, and the difference in the statistic), a predetermined value indicating small change in an image is determined in advance, and the predetermined value is set to the variation Va_3 for the third region. In the example using SSD as described above, minSSD indicating small change in an image is set.

Then, the inter-image variation calculating unit 153 calculates the inter-image variation V(i+1) based on the occupancy rate and the variation calculated for each of the first to the third regions (Step S137). More specifically, the sum of values obtained by multiplying the variations Va_1, Va_2, and Va_3 of the first to the third regions by the occupancies Occ_1, Occ_2, and Occ_3 of the first to the third regions, respectively, is calculated as the inter-image variation V(i+1) according to the following equation (10).

$$V(i+1)=Occ\_1 \times Va\_1 + Occ\_2 \times Va\_2 + Occ\_3 \times Va\_3 \quad (10)$$

In the present example, the method is described in which the inter-image variation is calculated by weighted average of the variation of each region in accordance with the occupancy rate. However, it is possible to employ a method in which the variations in the first and the second regions are obtained by an operation between images and then a larger value between the obtained values is set to the inter-image variation. In this case, when a region containing partial change exists, it is possible to calculate the inter-image variation that reflects the partial change.

Subsequently, as illustrated in FIG. 4, the arithmetic unit 15 increments the symbol indicating a temporal order of an image to be a processing target to i=i+1 (Step S15) and determines existence or nonexistence of the processing target image. When i≦i_end (YES at Step S17), the arithmetic unit 15 performs the processes from Step S5 to Step S15 by taking a next image as the processing target. On the other hand, when a determination result at Step S17 is NO, the process proceeds to Step S19.

In the present example, the image I(i) after the symbol i is incremented at Step S15 corresponds to the image I(i+1) before the increment. Therefore, the processes performed on the image I(i) at Steps S5 and S7 are already performed as the processes on the image I(i+1) before the increment. Consequently, it is possible to store a result before the increment in the storage unit 14 and read to use the result after the increment.

Then, the display-condition setting unit 155 sets a display condition for each image based on the inter-image variation (Step S19). In the present example, a method for setting a display time of each image and a method for setting whether or not to display each image, as the display condition for the image, will be described.

The method for setting the display time of each image is described first. The inter-image variations V(i) (i=i_start to i_end) already calculated by the processes from Step S3 to Step S17 are the inter-image variations obtained in consideration of the region of interest in each image. Therefore, it is preferable to lengthen a display time of an image as its inter-image variation increases. However, if the display time is lengthened, then an observation time is also lengthened. In a practical sense, it is preferable to determine in advance a display time maxT that allows an observer to fully check an image, and set the display time to maxT. On the other hand, the display time can be shortened for an image having a smaller inter-image variation. However, a minimum value of the display time is a value determined depending on a performance of a display device. Herein, the minimum value of the display time is assumed as minT.

Furthermore, a minimum value minV and a maximum value maxV that represent a range of values are set for the inter-image variations V(i). The values minV and maxV can be set in such a manner that, for example, the inter-image variations between a several sample sequence images are obtained in advance and minV and maxV are empirically set based on the obtained inter-image variations. Alternatively, it is possible to set the minimum value and the maximum value in the inter-image variations V(i) (i=i_start to i_end) calculated at the processes from Step S3 to Step S17 to minV and maxV, respectively.

Then, a display time T(i) of each image is calculated according to the following equation (11) based on maxT, minT, maxV, minV, and the inter-image variations V(i). Accordingly, the display time corresponding to the magnitude of the inter-image variations V(i) can be set in a range from minT to maxT.

$$T(i) = \frac{maxT - minT}{maxV - minV}(V(i) - minV) + minT \quad (11)$$

In the present example, the inter-image variation V(i) and the display time T(i) are associated with each other by a linear function as represented by equation (11). However, it is possible to associate them with each other by other non-linear functions as long as their association relation is represented by an increasing function.

Next, the method for setting whether or not to display each image is described. When the display time of all the images is set by using the method for setting the display time as mentioned above, even an image having almost no change is displayed in the minimum display time minT. Therefore, to enable more efficient observation, a display condition is set so that an image having almost no change is not to be displayed. More specifically, the display condition is set so as to display only an image whose inter-image variation V(i) is equal to or larger than a predetermined threshold that is determined in advance, and so as not to display other images.

Meanwhile, as the display condition for enabling to recognize an overview of the sequence images by a predetermined number of images, it is possible to set the display condition so as to display a predetermined number of the images in order from the largest inter-image variation. Practically, for example, the inter-image variations V(i) (i=i_start to i_end) are re-ordered in descending order by using a well-known sorting algorithm. Then, a threshold for maintaining a predetermined number of images in order from the largest value is obtained, and the display condition is set so as to display only images having values equal to or larger than the threshold and so as not to display other images.

In the present example, the method for setting the display time of each image and the method for setting whether or not to display each image are separately described. However, it is possible to employ a complex method in which a display time is set for an image that has been determined to be displayed by the method for setting whether or not to display each image.

In the end of the process, as illustrated in FIG. 4, the arithmetic unit 15 outputs the display condition, which is set for each image constituting the sequence images at Step S19 (Step S21), and then the process by the arithmetic unit 15 of the image processing device 10 ends.

Display of the sequence images is not limited by the image processing device 10. For example, it is possible to display the sequence images on a different apparatus such as a dedicated display device. In this case, at Step S21, the display condition set for each image is output to a corresponding device. Furthermore, setting of the display condition for each image need not be performed just before the sequence images are displayed. In this case, at Step S21, the display condition set for each image at Step S19 is output to be stored in the storage unit 14 or the portable recording medium 7, in association with each image. Then, when a command to display the sequence images is issued, each image is displayed by reference to the display condition stored in the storage unit 14 or the portable recording medium 7.

It is also possible to perform, instead of the process at Step S21, a process for displaying each image on the display unit 13 according to the display condition set at Step S19. Namely, when the display time for each image is set at Step S19, a process is performed such that each sequence image in a range from i_start to i_end is displayed in chronological order on the display unit 13 in accordance with each display time. Alternatively, when it is set whether or not to display each image at Step S19, a process is performed such that images determined to be displayed are displayed on the display unit 13 in chronological order.

As described above, according to the first embodiment, the inter-image variation corresponding to the region of interest in each image is calculated between a plurality of temporally neighboring images, and the display condition for each image is set based on the inter-image variation. Therefore, it is possible to properly set the display condition for each image constituting the sequence images. As a result, observation of a large number of the sequence images can be performed efficiently.

In the above-mentioned embodiment, the example is described in which the predetermined value indicating large change in an image is set as the inter-image variation V(i_start) for the image I(i_start) as a top image of the sequence images. However, when almost no region of interest exists in the top image, it is not necessarily preferable to set the predetermined value indicating large change in an image. Therefore, it is possible to calculate an occupancy rate of each of the region of interest and the region of non-interest in the top image. It is also possible to obtain the inter-image variation such that a variation in the region of interest is set to the predetermined value indicating large change in an image; a variation in the region of non-interest is set to the predetermined value indicating small change in an image; and the sum of products between an occupancy rate and a variation for each region is obtained as the inter-image variation.

Furthermore, in the above-mentioned embodiment, explanation about the setting of the display condition for each image of the sequence images is given with use of an example in which time-series intraluminal images captured by the capsule endoscope 3 are observed. However, the present invention is not limited to this example, and can be applied to a wide variety of image processing devices that process sequence images consisted of a plurality of images and set a display condition for each image.

For example, the present invention is applicable in a case where time-series surveillance images captured by a surveillance camera are observed. In case of application to the surveillance image, when an object that a surveyor intends to detect is "abnormal behavior of a human", a region containing a human (human region) is regarded as a region to be the observation target in which the object may be detected with high probability. Consequently, the "region of interest" in this case is the human region. Accordingly, a region other than the human region as the "region of interest", e.g., a region containing a background structural object is regarded as the "region of non-interest". On the other hand, when an object that the surveyor intends to detect is "change in the background structural object", the region containing the background structural object (background structural object region) is regarded as a region to be the observation target in which the object may be detected with high probability. Consequently, the "region of interest" in this case is the background structural object region, and a region other than the background structural object region as the "region of interest", e.g., the human region is regarded as the "region of non-interest".

Furthermore, in the above-mentioned embodiment, it is explained that the region-of-interest detecting unit 151 detects the region of interest based on the color feature data or the texture feature data. Alternatively, the configuration can be such that a user is allowed to specify the region of interest existing in an image via the input unit 12. In this case, in the image processing device 10, the control unit 16 or the like performs a process for displaying on the display unit 13 a notice of a request for specifying at least one of the region of interest and the region of non-interest in an image. Then, a region specified by the user by, for example, selecting a range in the image in response to the notice of request for specifying the region is set as the region of interest and/or the region of non-interest.

Moreover, it is possible to set a plurality of regions in an image according to the specification of at least one of the region of interest and the region of non-interest in an image by the user. For example, when a user specifies one region of interest in an image, it is possible to set two regions, such as the region of interest and a region other than the region of interest (e.g., the region of non-interest), in the image. Alternatively, when the user specifies one region of non-interest in an image, it is possible to set two regions, such as the region of non-interest and a region other than the region of non-interest (e.g., the region of interest), in the image.

Furthermore, the number of regions of interest to be specified in one image can be one or more. Similarly, the number of regions of non-interest to be specified in one image can be one or more.

According to the present invention, a plurality of temporally neighboring images can be divided into regions based on the region-of-interest detection result in the plurality of images, and the inter-image variation between the plurality of images can be calculated based on a variation in each region. Then, the display condition for each image can be set based on the calculated inter-image variation. Therefore, the display condition for each image constituting the sequence images can be set properly, making it possible to observe a large amount of sequence images efficiently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a region-of-interest detecting unit that detects a region of interest from each of sequence images acquired in chronological order;
   a region dividing unit that divides a plurality of images temporally neighboring to each other into regions based on region-of-interest detection results obtained from the plurality of images;
   an inter-image variation calculating unit that calculates an inter-image variation between the plurality of images based on a variation in each region divided by the region dividing unit; and
   a display-condition setting unit that sets a display condition for each image based on the inter-image variation.

2. The image processing device according to claim 1, wherein the region dividing unit divides the plurality of images into regions containing at least one of a region to be maintained in time series as a region of interest, a region to be maintained in time series as a region of non-interest that is other than the region of interest, a region to be changed in time series from the region of interest to the region of non-interest, and a region to be changed in time series from the region of non-interest to the region of interest, according to the region-of-interest detection results.

3. The image processing device according to claim 2, wherein the inter-image variation calculating unit calculates the inter-image variation using a predetermined value corresponding to at least one of a variation in the region to be changed from the region of non-interest to the region of interest, a variation in the region to be changed from the region of interest to the region of non-interest, and a variation in the region to be maintained as the region of non-interest.

4. The image processing device according to claim 3, wherein the inter-image variation calculating unit calculates the inter-image variation with the variation in the region to be changed from the region of non-interest to the region of interest as a predetermined value indicating large change in the image.

5. The image processing device according to claim 3, wherein the inter-image variation calculating unit calculates the inter-image variation with the variation in the region to be changed from the region of interest to the region of non-interest and with the variation in the region to be maintained as the region of non-interest as predetermined values each indicating small change in the image.

6. The image processing device according to claim 1, wherein the inter-image variation calculating unit calculates a variation in each region based on at least one of a similarity, a dissimilarity, a displacement amount, and change in a statistic of each region between the plurality of images.

7. The image processing device according to claim 1, wherein the inter-image variation calculating unit includes an occupancy-rate calculating unit that calculates an occupancy rate of each region in a whole image region, and calculates the inter-image variation based on the variation and the occupancy rate of each region.

8. The image processing device according to claim 7, wherein the inter-image variation calculating unit calculates, as the inter-image variation, a sum of values obtained by multiplying the variation in each region by the occupancy rate of each region.

9. The image processing device according to claim 1, wherein the display-condition setting unit sets a display time of each image based on the inter-image variation.

10. The image processing device according to claim 1, wherein the display-condition setting unit sets whether or not to display each image based on the inter-image variation.

11. The image processing device according to claim 10, wherein the display-condition setting unit sets the display condition so as to display an image having the inter-image variation larger than a predetermined threshold.

12. The image processing device according to claim 10, wherein the display-condition setting unit sets the display condition so as to display a predetermined number of images in order from largest inter-image variation.

13. The image processing device according to claim 1, wherein each of the sequence images is an in-vivo intraluminal image.

14. The image processing device according to claim 13, wherein the region of interest is a body tissue region in which an inner wall of an in-vivo intraluminal appears.

15. An image processing method comprising:
   detecting a region of interest from each of sequence images acquired in chronological order;
   dividing a plurality of images temporally neighboring to each other into regions based on region-of-interest detection results obtained from the plurality of images;
   calculating an inter-image variation between the plurality of images based on a variation in each region obtained at the dividing; and
   setting a display condition for each image based on the inter-image variation.

16. A computer readable storage device having stored therein an image processing program including instructions, the instructions causing a computer to execute:
   detecting a region of interest from each of sequence images acquired in chronological order;
   dividing a plurality of images temporally neighboring to each other into regions based on region-of-interest detection results obtained from the plurality of images;
   calculating an inter-image variation between the plurality of images based on a variation in each region obtained at the dividing; and
   setting a display condition for each image based on the inter-image variation.

* * * * *